No. 866,708. PATENTED SEPT. 24, 1907.
D. N. BAXTER.
CHECK ROW CORN PLANTER.
APPLICATION FILED NOV. 1, 1906.
2 SHEETS—SHEET 1.
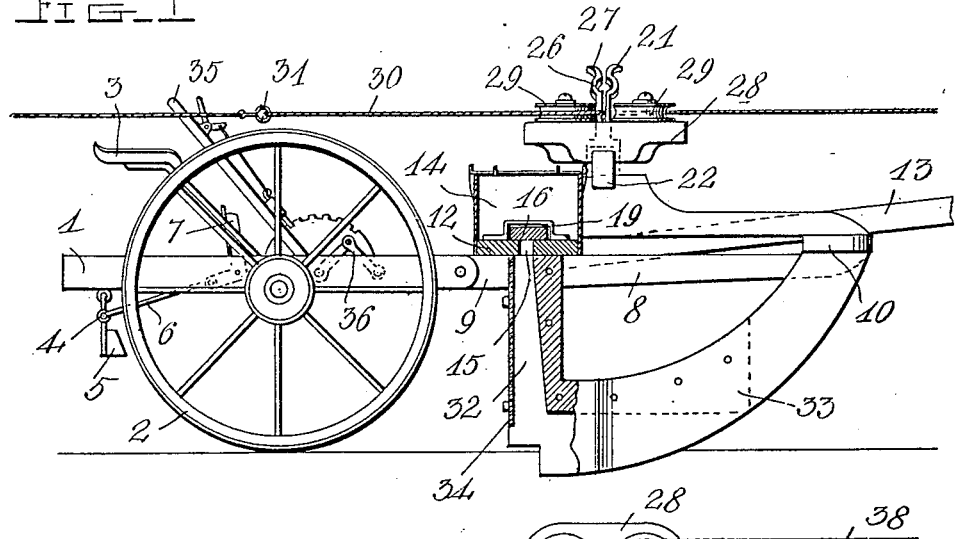
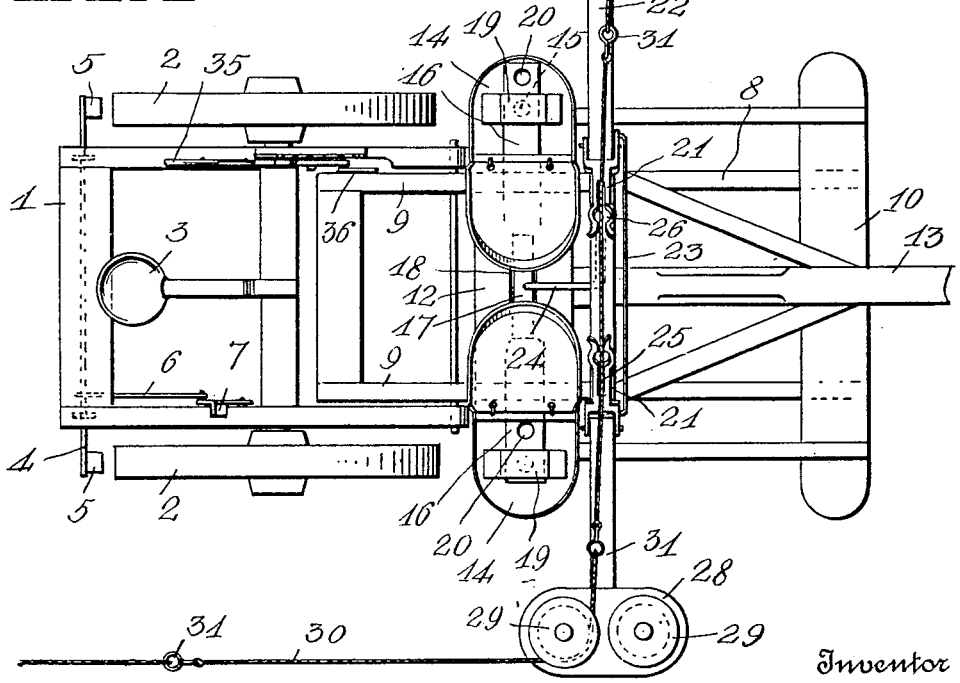
Witnesses
Inventor
D. N. Baxter No. 866,708. PATENTED SEPT. 24, 1907.
D. N. BAXTER.
CHECK ROW CORN PLANTER.
APPLICATION FILED NOV. 1, 1906.
2 SHEETS—SHEET 2.
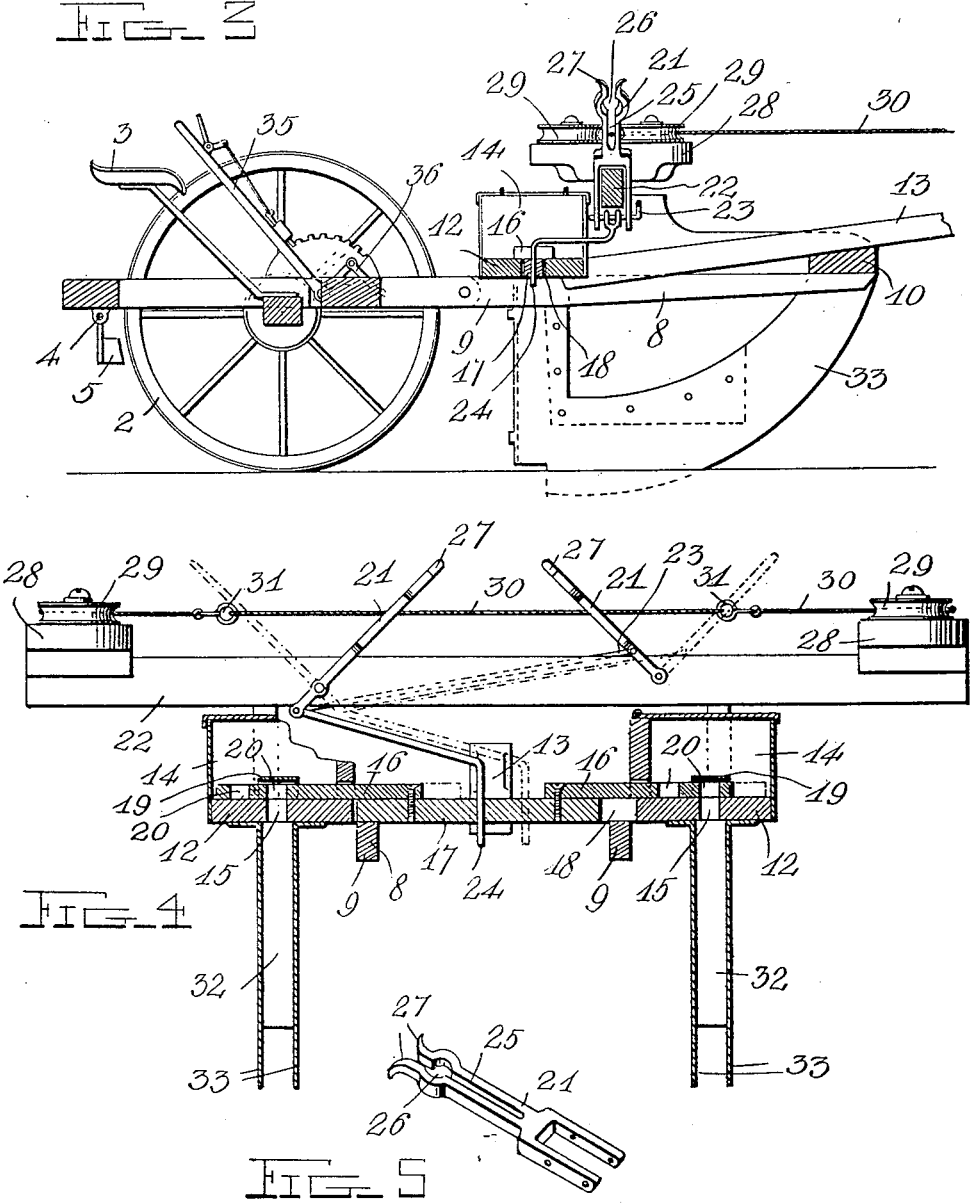
Witnesses
C. N. Griesbauer
Inventor
D. N. Baxter
by H. B. Willson & Co.
Attorneys

UNITED STATES PATENT OFFICE.

DANIEL N. BAXTER, OF WICHITA, KANSAS.

CHECK-ROW CORN-PLANTER.

No. 866,708.  Specification of Letters Patent.  Patented Sept. 24, 1907.

Application filed November 1, 1906. Serial No. 341,592.

*To all whom it may concern:*

Be it known that I, DANIEL N. BAXTER, a citizen of the United States, residing at Wichita, in the county of Sedgwick and State of Kansas, have invented certain new and useful Improvements in Check-Row Corn-Planters; and I do declare the following to be a full, clear, and exact description of the invention, such as will enable others skilled in the art to which it appertains to make and use the same.

This invention relates to improvements in check row corn planters.

The object of the invention is to provide a corn planter of this character having an improved valve operating mechanism by means of which the seed is regularly dropped from the seed hoppers.

A further object is to provide a corn planter having means whereby the dropping of the seed from the hoppers may be observed by the driver or operator of the machine.

With the above and other objects in view, the invention consists of certain novel features of construction, combination and arrangement of parts, as will be hereinafter described and claimed.

In the accompanying drawings:—Figure 1 is a side view, partly in section, of a corn planter constructed in accordance with the invention; Fig. 2 is a plan view of the same with the seed hoppers shown open; Fig. 3 is a central vertical longitudinal sectional view; Fig. 4 is a vertical cross sectional view, taken through the seed hoppers, showing the trip levers in one position in full lines and in another position in dotted lines; and Fig. 5 is a detail perspective view of one of the valve operating trip levers.

Referring more particularly to the drawings, 1 denotes the main frame, which is mounted on supporting wheels 2. A seat 3 is arranged on said frame 1 and pivotally mounted on the rear cross bar of said frame is a brake bar 4 having brake shoes or cleaners 5. Formed on the brake bar 4 is a crank, to which is connected an operating rod 6, the opposite end of which is connected to a foot lever 7 pivotally mounted on one of the side bars of the frame 1, as shown.

Pivotally connected to the forward ends of the side bars of the frame 1 is a hopper frame 8, comprising longitudinal bars 9 which are connected by front and rear cross bars 10 and 12, and to said bars is attached a draft tongue 13. Arranged on the ends of the rear cross bar 12 are seed hoppers 14, the bottoms of which are formed by the ends of the bar 12, as shown, said bottoms having formed therein centrally disposed feed openings 15.

Adapted to slide in and out of the hoppers 14 are feed valve plates 16, which are connected together by a bar 17 slidably mounted in a slot 18 formed in the rear cross bar 12, as shown. The inner ends of the plates 16 extend over the slot 18 and are secured to the top of the bar 17, thereby supporting said bar in the slot without the need of other means; and by providing the bar with a perforation for the shifting bar, a very simple and effective structure is secured. In the hoppers 14 are arranged transversely - disposed cover or cut off plates 19, beneath which the valve plates 16 are adapted to slide. In each of the valve plates 16 is formed two apertures, which form seed pockets 20. The pockets 20 are arranged in the plates 16 so that when the latter are reciprocated in the hoppers, the pockets will be alternately brought beneath the cover plates 19; and when brought beneath said plates, the apertures or pockets will aline with the discharge or feed openings 15 and the seed therein will be discharged through said openings into the seed tubes of the planter. Each pocket will receive a charge of seed from the hopper as said pocket is moved from beneath the cover plate 19, as will be understood.

The valve plates 16 are reciprocated in the hoppers 14 by means of trip levers 21, which are bifurcated at their lower ends and pivotally mounted on a cross bar 22 secured to the hopper frame, as shown. The levers 21 are connected together by a rod 23, said rod being connected to one of said levers above its pivotal connection with the bar 22, and with the other lever below its pivotal connection with said bar, said lever being extended for that purpose, so that when one of said levers is rocked in one direction, the other will be rocked in the opposite direction. One of the levers 21 is connected to the connecting bar 17 of the valve plates 16, by means of an angularly bent operating bar 24, whereby said bar 17 and the valve plates 16 are reciprocated by both of said levers, by reason of the latter being connected together as hereinbefore described. The upper end of the bar 17 is preferably bifurcated as shown in Fig. 3, and engages with the rod 23 between the extended bifurcated ends of one of the levers 21, the end of the rod being bent at an angle and passed through said bifurcations for the reception of the bar.

The upper ends of the levers 21 are slitted inwardly a suitable distance, as at 25, said slitted ends being intersected by circular apertures 26 formed in said levers near their outer ends. The outer ends of the levers are curved or flared outwardly, as shown at 27.

On the outer ends of the bar 22 are arranged bearing plates 28, on each of which is pivotally mounted a pair of grooved guide pulleys 29, between which and through the slits 25 and apertures 26 of the levers 21 is adapted to be drawn a check line 30, on which is arranged at suitable intervals, checks or tappets 31. Said tappets 31 are here shown in the form of links which will pass freely through the apertures in the levers 21, but will not pass through the slits 25, so that when the line 30 is drawn, through said slits, the levers will be engaged by the tappets 31 opposite the slitted portions of the former and thereby rocked in the direction the line is apparently moving as it passes over the pulleys 29.

The tappets after engaging the slitted portion of the levers and rocking the same will slide up the levers and pass through the apertures 26 in the upper portions of the same without the danger of their passing entirely out of the slit as would be the case without the aperture. By arranging the levers 21 and connecting the same as hereinbefore described, they are successively engaged and rocked by the tappets first in one direction and then the other, as will be understood, thereby producing a rapid movement of the seed valve plates.

Below the discharge aperture in each seed hopper is arranged a discharge tube 32, said tubes being arranged in the rear and preferably forming a part of runners or furrow opening shoes 33 connected to the bottom of the frame, as shown. The discharge tubes 32 are preferably provided with transparent rear walls 34, whereby the passage of the seed therethrough may be observed by the driver or operator of the machine.

Pivotally mounted on the main frame 1 is a bell-crank regulating lever 35, the short arm of which is connected by a link 36 to the inner end of hopper frame 8. The lever 35 is provided with the usual pawl and rack, whereby the same is held in adjusted position. By means of the lever 35, the hopper frame may be tilted and the runners thereby forced more or less deeply into the ground.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

1. In a check row planter, a main frame, a hopper frame pivotally connected therewith and provided with furrow openers, the rear cross bar of the hopper frame being perforated at each end to register with said openers, and slotted longitudinally intermediate said ends, a feed hopper over each perforation, the end of the bar forming the bottom of the hopper, a cover plate in each hopper over said perforation, a bar slidably mounted in said slot, a valve plate secured at its inner end to the top of each end of said bar with its outer end under the cover plate in the box and provided with two apertures, and check-row mechanism connected with said last mentioned bar to reciprocate it in both directions.

2. In a check row planter, a main frame, a hopper frame pivotally connected therewith, seeding mechanism on the hopper frame provided with a reciprocatory bar, two bifurcated levers pivotally mounted adjacent thereto, the lower end of one of the levers being extended, a rod connected with one of the levers above its pivotal point at one end and having its other end bent at an angle and passed through said extended end of the other lever, and an angularly bent bar connected with the reciprocatory bar at one end and having its other end connected with the end of said rod between the extended bifurcated end of said lever.

In testimony whereof I have hereunto set my hand in presence of two subscribing witnesses.

DANIEL N. BAXTER.

Witnesses:
 FINLAY ROSS,
 A. S. BUZZI.